(12) United States Patent
Kingsbury et al.

(10) Patent No.: US 6,284,162 B1
(45) Date of Patent: Sep. 4, 2001

(54) MOLDING METHOD FOR MANUFACTURING THIN THERMOPLASTIC LENSES

(75) Inventors: Jeffrey M. Kingsbury, Cotati; Michael J. Tuhtan, Sebastopol; Robert H. Juul, Santa Rosa; Martin P. Rolph, Sebastopol, all of CA (US)

(73) Assignee: Sola International, Inc., Sunnyvale, CA (US)

( * ) Notice: Subject to any disclaimer, the term of this patent is extended or adjusted under 35 U.S.C. 154(b) by 0 days.

(21) Appl. No.: 09/277,035

(22) Filed: Mar. 25, 1999

(51) Int. Cl.[7] ................................................. B29D 11/00
(52) U.S. Cl. ..................... 264/2.2; 264/328.7; 264/328.8
(58) Field of Search .......................... 264/1.1, 2.2, 2.3, 264/328.7, 328.8; 425/808

(56) References Cited

U.S. PATENT DOCUMENTS

| | | |
|---|---|---|
| 2,443,286 | 6/1948 | Weston . |
| 4,008,031 | 2/1977 | Weber . |
| 4,091,057 | 5/1978 | Weber . |
| 4,364,878 | 12/1982 | Laliberte et al. . |
| 4,828,769 | 5/1989 | Maus et al. . |
| 4,836,960 | * 6/1989 | Spector et al. ........................ 264/2.2 |
| 4,900,242 | 2/1990 | Maus et al. . |
| 5,340,528 | 8/1994 | Machida et al. . |
| 5,376,317 | 12/1994 | Maus et al. . |
| 5,512,221 | * 4/1996 | Maus et al. ........................... 264/2.2 |
| 5,718,849 | 2/1998 | Maus et al. . |
| 5,968,439 | 10/1999 | Grove . |

FOREIGN PATENT DOCUMENTS

| | | |
|---|---|---|
| 0 348 129 | 12/1989 | (EP) . |
| 61-66623 | * 4/1986 | (JP) . |

OTHER PUBLICATIONS

Patent Abstracts of Japan, vol. 10, No. 62 (M–460), Mar. 12, 1986, JP 60–208215, Hitachi Seisakush KK, Oct. 19, 1985.
Patent Abstracts of Japan, vol. 18, No. 438 (M–1656), Aug. 16, 1994, JP 06–135223, Nippondenso Co., Ltd., May 17, 1994.

* cited by examiner

*Primary Examiner*—Mathieu D. Vargot
(74) *Attorney, Agent, or Firm*—Burns, Doane, Swecker & Mathis, L.L.P.

(57) ABSTRACT

Disclosed are novel molding methods for manufacturing thin thermoplastic lenses and, in particular, minus ophthalmic lenses that have thickness of about 1 mm or less at the thinnest point thereof. The molding methods disclosed provide for lenses which lack any abrasion or polishing artifacts on the surface and also lack any negative fining marks below the nominal surface.

24 Claims, 6 Drawing Sheets

MOLDING METHOD FOR MANUFACTURING THIN THERMOPLASTIC LENSES

BACKGROUND OF THE INVENTION

Field of the Invention

This invention relates to novel molding methods for the manufacture of thin thermoplastic lenses and is particularly adaptable for the manufacture of minus ophthalmic lenses that have thickness of about 1 mm or less.

REFERENCES

The following patents are cited in this application as superscript numbers:
1. Johnson, et al., "Compressor Unit" U.S. Pat. No. 2,443,286, issued Jun. 22, 1948
2. Weber, "Apparatus for Injection Molding Lenses", U.S. Pat. No. 4,008,031, issued Feb. 15, 1977
3. Weber, "Method for Injection Molding Lenses", U.S. Pat. No. 4,091,057, issued May 23, 1978
4. Laliberte, "Method for Molding Ophthalmic Lenses", U.S. Pat. No. 4,364,878, issued Dec. 21, 1982

All of the above patents are herein incorporated by reference in their entirety to the same extent as if each individual patent was specifically and individually indicated to be incorporated by reference in its entirety.

2. State of the Art

Lenses are used for a variety of purposes, for example in optical devices such as microscopes and eye glasses. Over the past few years, the use of thermoplastic material to prepare ophthalmic lenses for such uses as in vision corrective and in prescriptive ($R_x$) spectacle lenses as opposed to traditional glass lenses has increased dramatically because thermoplastic lenses offer several advantages over glass. For example, plastic is lighter than glass and hence spectacles with plastic lens are more comfortable to wear especially since the nominal lens thickness is typically 2.0–2.2 mm. Other factors for increased demand for thermoplastic lenses are that these lenses can be made scratch and abrasion resistant, they come in a wide range of fashionable colors, and because the production techniques have improved so that they can now be manufactured at higher rates and in a more automated fashion.

Of the thermoplastic lenses, the use of polycarbonate thermoplastic is becoming very attractive as compared to, for example, lenses made from individual casting and thermoset-peroxide curing allylic resins. Factors favoring polycarbonate thermoplastic lenses include lower density and higher refractive index than cast-thermoset plastic. Hence, thinner lenses in the range of 1.5–2.0 mm thickness can be made. In addition, polycarbonate lenses of the same nominal thickness as thermoset-peroxide cured allylic resins will be of lighter weight, due to lower density, and therefore will impart greater wearer comfort. Furthermore, polycarbonate thermoplastic lenses have far greater impact and breakage resistance than any other optical grade polymeric material.

Heretofore, thermoplastic, injection-molded lenses have been manufactured by injection molding with or without any compression. Injection molding without any compression typically involves the use of a mold cavity having fixed surfaces throughout the molding cycle. Such molding processes employ very long molding cycles, high mold-surface temperatures, higher than average plastication and melt temperatures for that given resin, and slow controlled fill rates followed by very high packing pressures which are held until gate freeze-off is complete.

Fixed cavity processes of the type described above, employ larger than normal gating and runner systems to permit maximum packing pressure and delivered material before gate freeze-off occurs, at which time no further transfer of molten polymer occurs between the runner system or plasticating unit and the cavity. Gate freeze-off in a fixed cavity injection machine presents a problem, given that powered lenses have differing front and back radii of curvature, prescription lenses must therefore have differing cross-sectional thicknesses which in turn leads to non-uniform shrinkage during part formation in the mold cavity and cooling-down which can cause poor optics and/or distortion. In addition, the thickest sections of the lens are subject to slight sink marks or depressions which in turn cause a break in the otherwise uniform radius of curvature of the lens surface. This break results in a localized aberration or deviation in the light bending character of the lens at that area of sink.

Thus, although great care is taken to see that the injected polymer mass conforms perfectly to the fixed lens mold cavity surface, contour, and dimensions, once gate freeze-off prevents additional packing pressure and material transfer, differential shrinkage begins to occur within the polymer melt and the polymer skin begins to pull away from the mold surfaces accordingly. This pre-release detrimentally affects optical quality since the molded lens contour and surface no longer can be forced by intimate contact to exactly replicate the precision optical mold surfaces and cure contours. Also, a fixed cavity molding process is limited in how thin the lens center can be. Below about 2 mm, the molten plastic preferentially flows around the thick edge leaving a void and/or knit line which extends into the central zone of the to-be-formed lens.

To address these problems with fixed cavity molding processes, compression molding techniques have been used. The injection/compression molding techniques are divided into two types (i) the clamp-end injection/compression and (ii) the auxiliary component injection/compression. In the clamp-end injection/compression method, the molten polymer is injected into a mold space formed by moving the mold platens and mold halves to a predetermined position. After or during injection, the molten polymer mass is allowed to cool for a predetermined time interval and the injection molding machine commences a closing motion of the movable platen. This clamping-up motion compensates for shrinkage occurring during freezing of the molten polymer. Under this clamp-induced compressive force, the mold cavity's contents continue cooling and solidifying, eventually reaching a temperature sufficiently below the glass-transition temperature, or freezing point, of the injected polymer that the molded article may be safely ejected without risking optical distortion. However, in view of the high clamp pressure, thin centered lenses cannot be used in this process due to crushing of the frozen center portion while the remaining areas of the mold retain molten polymer.

This method however, has severe limitations. First, it is critical to carefully control the injection pressure and fill rate, along with the timing interval. For example, the injected melt must be allowed to form a surface skin and partially solidify to prevent molten polymer from spilling outside the desired runner-mold-cavity configurations, necessitating costly and laborious trimming operations on the molded part. Second, if the melt solidifies to too great an extent, compression at ultimate clamping pressures can cause hobbing or deformation of the mating plats at the parting line, thus damaging the mold set. Third, if compression is delayed too long, too much polymer solidification will have occurred when the compressive force through final clamp-up is initiated, resulting in forceable reorientation of the polymer and cold working of the plastic, which, in turn, produces birefringence and undesirable molded-in stress levels, with resulting localized nonuniform light-bending characteristics.

In the auxiliary component injection/compression method the compressive pressure is applied to the opposing optical surfaces via auxiliary springs, cylinders or the like which are either internal to the mold itself or as peripheral apparatus thereto. Early thermoplastic lens molding of this type employed simple spring-loaded, movable optical dies within the mold set[1]. Such apparatus created a variable volume lens mold cavity thereby, but relied upon high internal polymer melt pressure to spread the movable dies against the resisting spring pressure. In order to apply sufficiently great compressive forces upon the solidifying mold contents, these spring forces were great. However, the greater the spring force, the greater the injection pressure that must be used to compress the springs during variable cavity fill. The greater the injection pressure required, the greater the degree of molded-in stresses and optically unsatisfactory birefringence. The greater the optical power for the molded lens, the greater the dissimilarity between the front and back curves and thus the greater the cross-sectional thickness variation. Therefore, this process is limited to production of weakly powered lenses with minimal diameter and minimal thickness variations.

Another auxiliary component process is represented by Weber[2,3]. Weber teaches a variable-volume cavity formed by injection-melt, pressure induced rearward deflection of at least one movable male or female die which after a certain interval is followed by forward displacement resulting in compression under the driving force of an auxiliary hydraulic cylinder mounted in one-to-one relationship with this movable die. Flow ports are provided through which excess polymer melt is forcibly extruded from the lens cavity under the compressive forces. Weber too relies upon a preset amount of time to elapse between completion of injection fill and commencing compressive pressure. Therefore, this process too suffers from defects caused by premature compression or excessively delayed compression discussed above. Additionally, this process can produce lenses of inconsistent thickness.

Another auxiliary component process is described by Laliberte[4]. This process includes a movable die coupled to an auxiliary hydraulic cylinder. After the mold is closed under clamp pressure, the mating die parts are spread apart by injection of a polymer. A fixed amount of polymer, adequate to fill the fully compressed mold-cavity system is then injected. This process permits greater control of nominal lens thickness and therefore eliminates material scrap waste and trimming operations. However, Laliberte discloses lens thickness control but only with regard to nominal 3.0 mm center thickness which is significantly greater than the desired consumer lens thickness.

Another major short-coming of the injection/compression molding processes described above is that they are unsuitable for manufacturing $R_x$ lenses, especially minus thermoplastic lenses having a center thickness of about 1 mm or less and having edge thicknesses greater than the center thickness. This is because the injected thermoplastic melt in the thinner center portion of the minus lens freezes prior to the freezing of the melt in the thicker edge portions. As a result, the compressive pressures generated by the mold halves (optical inserts) at this point of solidification is focused only on the frozen center portion which crushes or otherwise distorts this part of the lens. Such crushing or distorting of the frozen center is particularly problematic at center thicknesses of about 1 mm or less and having molten edge thicknesses substantially larger since the entire compressive force is concentrated on a small diameter, thin column of frozen material at the center. Also, this force exceeds the compressive strength of the solidified material. However, as is apparent, thin centered minus lenses having a thickness of about 1 mm or less are particularly desirable as having still further reduction in weight as compared to conventional minus lenses having a center thickness greater than about 1 mm (e.g., 1.5 mm).

In view of the inability of injection/compression molding processes to prepare thin centered minus lenses, such lenses have been manufactured by abrading and polishing thicker lenses. Such manufacturing techniques employ abrading and polishing elements such as optical curve generating, fining and polishing machines which inevitably leave abrasion/polishing residues on the lens surface and/or leave negative fining marks below the nominal surface.

SUMMARY OF THE INVENTION

This invention is directed to novel molding methods for manufacturing thin thermoplastic lenses, in particular minus lenses having a center portion of about 1 mm or less. In one embodiment, the methods of this invention provide for thin thermoplastic minus lenses that lack any abrasion or polishing artifacts on the surface thereof and also lack any negative fining marks below the nominal surface.

In particular, this invention relates to the molding methods for the preparation of thin lenses which initially involve compression of the lens mold halves prior to freezing of the thermoplastic melt. Subsequently, the mold halves are maintained in place while pressure is increased on the thermoplastic melt to compensate for the shrinkage which occurs during solidification of the melt in the mold. Subsequent cooling of the mold results in formation of the lens.

The methods of this invention are particularly advantageous in that a mold process is employed wherein crushing of the thin lens by the molds during manufacture is avoided.

Accordingly, in one of its method aspects, this invention is directed to a method for manufacturing a thermoplastic lens which comprises:

(a) providing a mold comprising a male mold half and a female mold half wherein said mold halves, when closed, define a mold cavity in the shape of a lens;

(b) introducing into the mold cavity a molten thermoplastic material in a quantity at least sufficient to form a lens;

(c) moving at least one of said male and female mold halves to a pre-determined position prior to freezing of the thermoplastic material at the thinnest point of the to-be-formed lens;

(d) maintaining said mold halves in a stationary position while increasing pressure in the mold cavity; and (e) permitting the thermoplastic material to freeze thereby forming the thermoplastic lens.

In one embodiment, the increase in mold pressure in the mold cavity is achieved by injection of further melted thermoplastic resin into the mold. In another embodiment, this increase in internal cavity pressure is achieved by an injector, or by use of one or more screws, secondary pistons, pins, or other mechanisms.

In a second of its method aspects, this invention provides a method for manufacturing a thermoplastic lens which comprises:
(a) providing a mold comprising a male and female mold halves wherein said mold halves, when closed, define a mold cavity in the shape of a thermoplastic lens;
(b) introducing into the mold cavity a molten thermoplastic polycarbonate material in a quantity at least sufficient to form the lens wherein said thermoplastic polycarbonate material is maintained at a temperature above about 575° F. which permits the material to flow;
(c) moving at least one of said male and female mold halves to a pre-determined position wherein the mold cavity has a center thickness of about 1 mm or less prior to freezing of the thermoplastic material at the thinnest point of the to-be-formed lens;
(d) maintaining said mold halves in a stationary position while increasing pressure in the mold cavity by use of an injector or injectors to maintain a constant volume within the mold; and
(e) permitting the thermoplastic material to freeze thereby forming the thermoplastic ophthalmic lens.

In one of its article of manufacture aspects, this invention relates to a thermoplastic lens configured to have a minus correction which lens has a minimal thickness of about 1 mm or less wherein said lens is free of abrasion or polishing artifacts on the surface thereof and lacks negative fining marks below its nominal surface.

BRIEF DESCRIPTION OF THE DRAWINGS

The invention will now be described in greater detail with reference to the preferred embodiments illustrated in the accompanying drawings, in which like elements bear like reference numerals, and wherein.

DETAILED DESCRIPTION OF THE INVENTION

Figure 1:
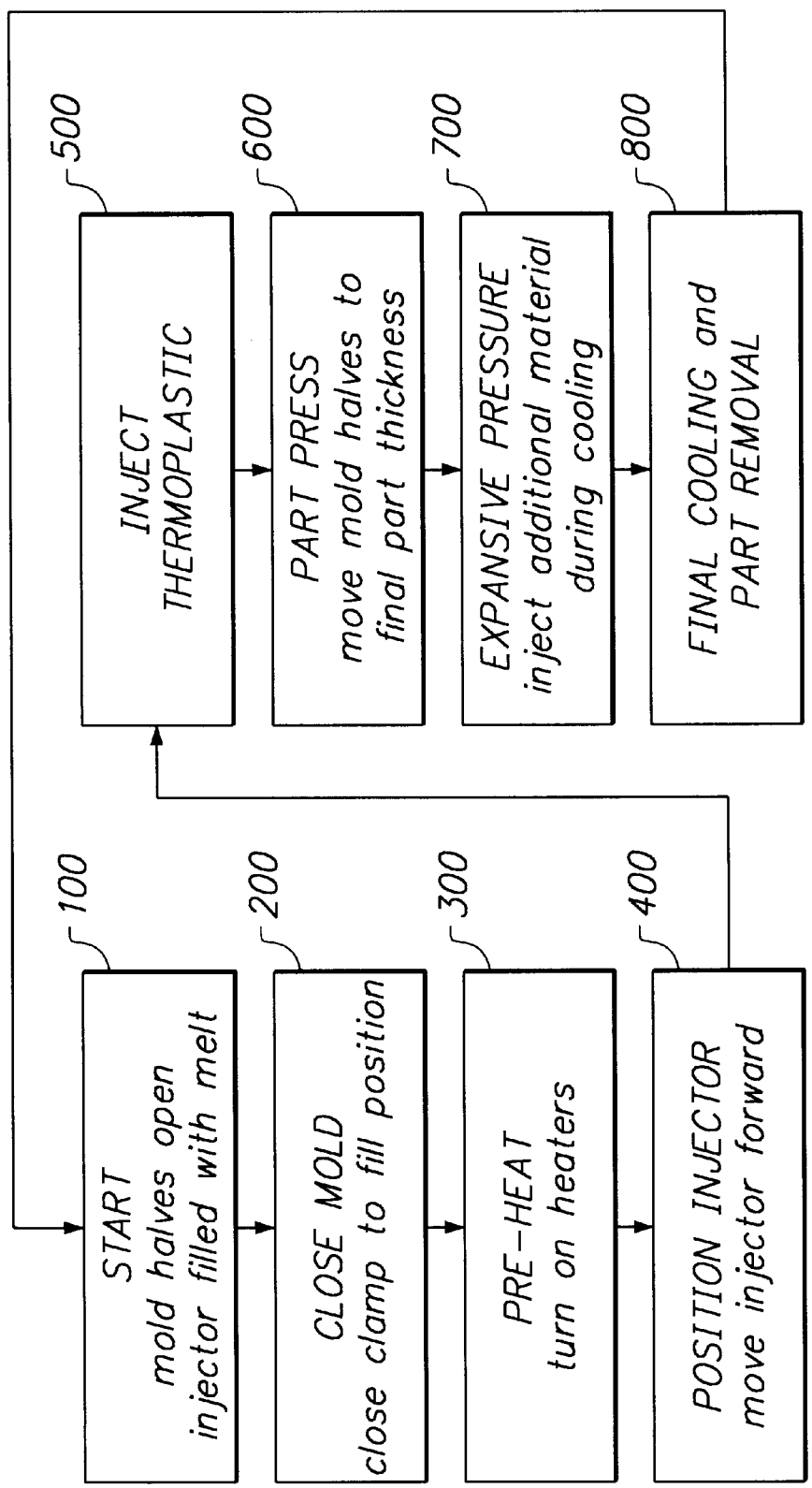
FIG. 1 is a flow diagram illustrating the methods of the present invention.

As noted above, this invention relates to novel molding methods for the manufacture of thin thermoplastic lenses, as well as to novel thin thermoplastic lenses. However, prior to describing this invention in further detail, the following terms will first be defined.

Definitions

As used herein, the following terms have the following meanings.

"Molten thermoplastic polymer" or "melt" refers to the softened physical state of an amorphous or crystalline thermoplastic polymer which permits the polymer to flow. Preferably, the molten thermoplastic material flows under such pressure when it is heated above its glass transition ($T_g$) or melting temperature ($T_m$), respectively.

"Freeze" or "freezing" refers to cooling a molten thermoplastic polymer to a temperature wherein it no longer flows.

"Flows" or "flowable" refers to the ability of a molten thermoplastic polymer to flow at a flow rate of at least 3 mfi (melt flow index) as determined by ASTM Test No. D1238 which measures the flow rate or melt index by extrusion plastometer.

"Thermoplastic" refers to polymers which are capable of reversibly softening or fusing when heated and hardening when cooled. Suitable thermoplastic materials are well known in the art and include, by way of example, polycarbonates, diethylene glycol bis(allylcarbonate), acrylics, polyurethane and other high index materials. Preferably, the thermoplastic material is polycarbonate.

"Stationary position" refers to a mold position wherein the mold halves are substantially fixed in space and each mold half does not move more than about ±0.05 mm. Preferably there is no movement when the mold halves are in the stationary position. While force may be necessary to maintain the stationary position of the mold halves, additional force is not applied to bring the mold halves into closer proximity.

Methodology

The methods of this invention are directed to a molding processes for the preparation of thermoplastic lenses. These methods employ a conventional mold comprising a male mold half and a female mold half wherein said mold halves, when closed, define a mold cavity in the shape of a lens. Any conventional molds can be used and are well known in the art.

The methods of the invention allow the manufacture of thin thermoplastic lenses having a thickness of about 1 mm or less at a thinnest portion without crushing or distorting the thin part of the lens. These thin lenses are achieved by fixing the mold halves after injection of thermoplastic and applying an expansive pressure to compensate for shrinkage of the thermoplastic during cooling.

In the methods of this invention, the mold cavity is formed by closing the male and female mold halves. Initially, the mold is closed to a position where a distance between the mold halves is greater than a final desired lens thickness. The closing process may entail movement of at least one or both of the mold halves to precisely define an enlarged mold cavity. Then, molten thermoplastic material, preferably heated above its $T_g$ is injected into the mold cavity. In a preferred embodiment, an injector for delivering the thermoplastic to the mold employs a short/hot runner to ensure that the thermoplastic material remains in a molten form during the injection process. In an alternative preferred embodiment, the thermoplastic material may be delivered via a heated injection port or, still further, a combination of a short/hot runner and a heated injection port can be used.

In another preferred embodiment, the mold halves are heated, preferably above the $T_g$ of the thermoplastic material during the injection process to ensure against premature freezing of the polymer melt. More preferably, the mold halves are heated to a temperature of above about 275° F. and even more preferably to a temperature of about 290° F. to about 340° F.

At least a sufficient amount of molten thermoplastic material is then added to the mold cavity to form the lens. In some cases, a slight excess of molten material may be added in order to ensure complete filling of the cavity. Obviously, the specific amount of such material employed corresponds to the dimensions of the to-be-formed lens which is readily ascertainable by the skilled artisan.

Subsequently, at least one of the male and female mold halves is moved toward the other mold half to compress the thermoplastic material and generate contractive pressure within the mold cavity while maintaining the polymer therein in the molten state. The closing of the mold halves continues until a hard stop point between the mold halves is reached. The distance between the male and female mold halves at this hard stop point corresponds to the desired thickness of the to-be-formed lens which is preferably about 1 mm or less, more preferably from about 0.5 mm to 1 mm, and even more preferably from about 0.7 mm to 1 mm. Again, during compression, the thermoplastic material within the mold cavity is maintained in a molten state, including the material at the thinnest point of the to-be-formed lens, when this hard stop point is reached.

At this point, the mold halves are then maintained in a stationary position while increasing pressure within the mold cavity in order to compensate for thermoplastic shrinkage in the mold cavity during freezing thereby maintaining conformity of the thermoplastic material to the mold. The increase in cavity pressure is preferably achieved by expansive pressure. In one preferred embodiment, expansive pressure is created within the cavity by use of one or more injectors which injects additional molten thermoplastic material into the mold cavity as needed. As before, the injector(s) and/or injector port(s) can optionally be heated to ensure that the additional thermoplastic injected material remains in a molten form. The expansive pressure is preferably applied until freezing is complete or substantially complete.

In another preferred embodiment, expansive pressure is created within the mold cavity by use of one or more screws, secondary pistons, pins, flexible compression rings, bellows, or the like. These screws, pins, or pistons, apply a force to the thermoplastic material during freezing to compensate for shrinkage. The force is preferably applied inwardly from the sides of the mold cavity or substantially perpendicular to the direction of mold opening and closing.

Once such expansive force is established within the mold cavity, the thermoplastic material is cooled and, upon freezing, a suitable lens is formed. In one preferred embodiment, cooling and subsequent freezing of the thermoplastic material is achieved by cooling of the molds. As discussed above, the use of expansive force at this point in the manufacturing process inhibits crushing at the thinnest point of the lens which freezes first.

FIG. 1 is a flow diagram illustrating the method according to one embodiment of this invention. FIGS. 2–6 illustrate the steps of the method according to the present invention as it is performed with one exemplary mold system.

The process for forming a thermoplastic lens according to one embodiment of the present invention begins at step 100 with the mold halves in an open position to remove the previously formed part and with the injector filled with a thermoplastic material. In step 200 the mold is closed to a predetermined position in which the mold halves are separated by a space which is greater than the size of the final to be formed lens. During or after mold closing, the mold is preferably heated in a preheating step 300. In addition to or as an alternative to preheating the mold, the injector may be heated. During or after preheating in step 400, the thermoplastic material injector is moved forward so that the injector contacts a fill port of the mold in preparation for the injection of the thermoplastic material. In step 500, the thermoplastic material is injected at a high pressure. Following injection of the thermoplastic material, step 600 involves part press or coining in which the mold halves are moved towards each other to a final part thickness. In step 700, expansive pressure is applied to the thermoplastic material within the mold. As described above, this expansive pressure may be applied in a variety of ways. For example, expansive pressure may be applied by injection of addition thermoplastic material during cooling. Finally in step 800, final cooling of the part, opening of the mold, and part removal are performed. Once the part has been removed the process returns to step 100 for formation of another part.

Figure 2:
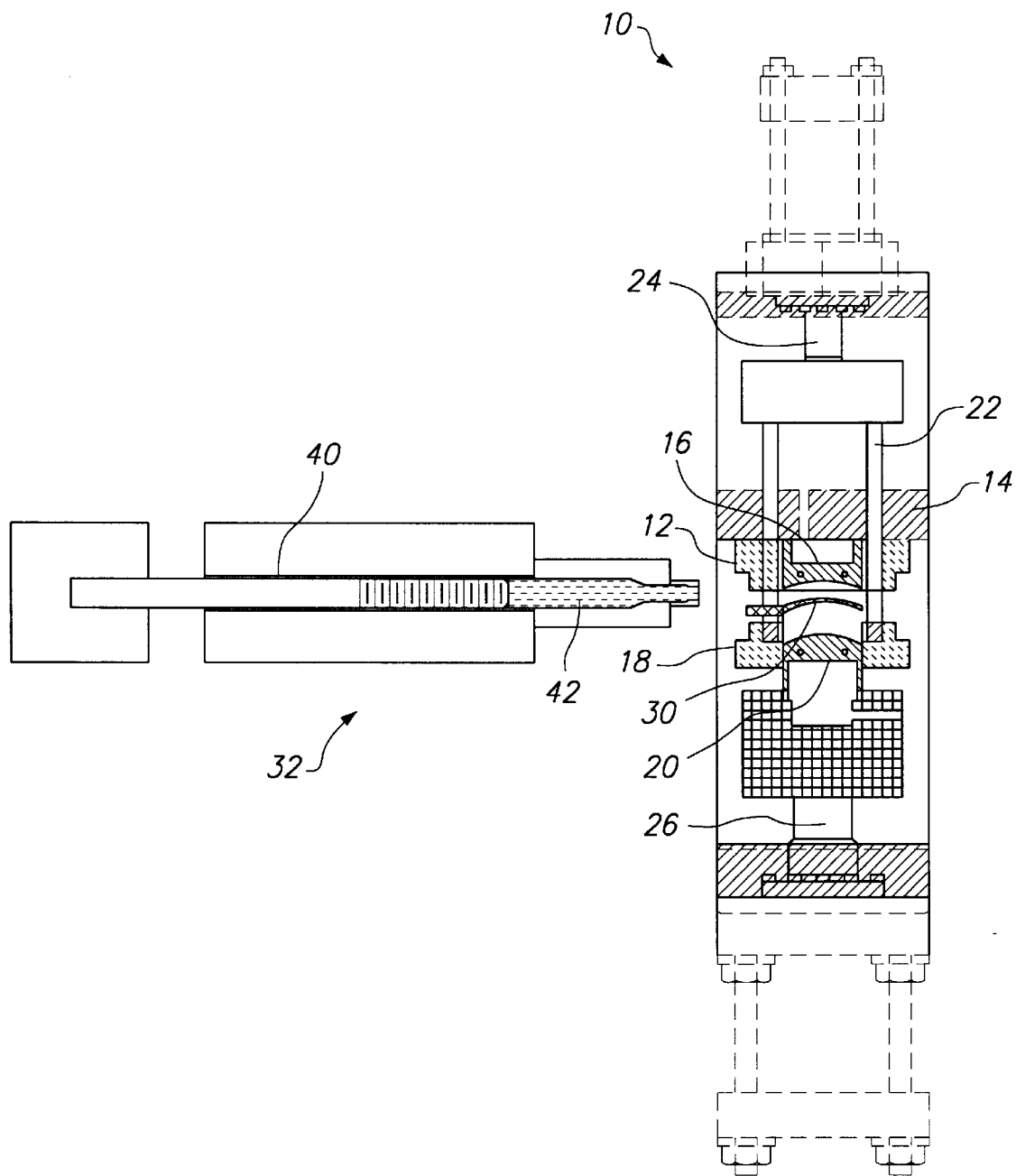
FIG. 2 is a schematic side view of a mold in a starting position.

FIG. 2 illustrates a mold 10 in a starting position in which the mold halves are in an open position. The mold 10 includes an upper mold cavity half 12 which is fixed to a bolster plate 14. The upper mold cavity half 12 has an upper mold member 16 which is also fixed to the bolster plate 14. Alternatively, the upper mold member 16 may be movable within the upper mold cavity half 12. The mold 10 also includes a lower mold cavity half 18 with a movable lower mold member 20. The lower mold cavity half 18 is connected by a plurality of connecting rods 22 to a hydraulic cylinder 24 which is positioned above the upper mold cavity half 12. The connecting rods 22 extend through the upper mold cavity half 12 to move the lower mold cavity half 18 with respect to the upper mold cavity half. The lower mold member 20 is movable within the lower mold cavity half 18 by a second hydraulic cylinder 26 positioned below the lower mold member. In the starting position illustrated in FIG. 2, both the lower mold cavity half 18 and the lower mold member 20 are lowered to allow the prior part 30 to be removed from the mold 10.

The mold 10 is also provided with an injection unit or injector 32 having a barrel 40 used to melt thermoplastic pellets to prepare the thermoplastic material 42 for injection into the mold cavity. The upper and lower mold members 16, 20 are preferably heated by passing heated fluid through channels in the mold members. In another preferred embodiment, electric heat can be generated by electric cartridge heaters thermally coupled to the mold inserts optionally containing heated fluid channels. The heating of the mold members 16, 20 allows the thermoplastic material 42 to be injected completely before the material begins to cool.

Figure 3:
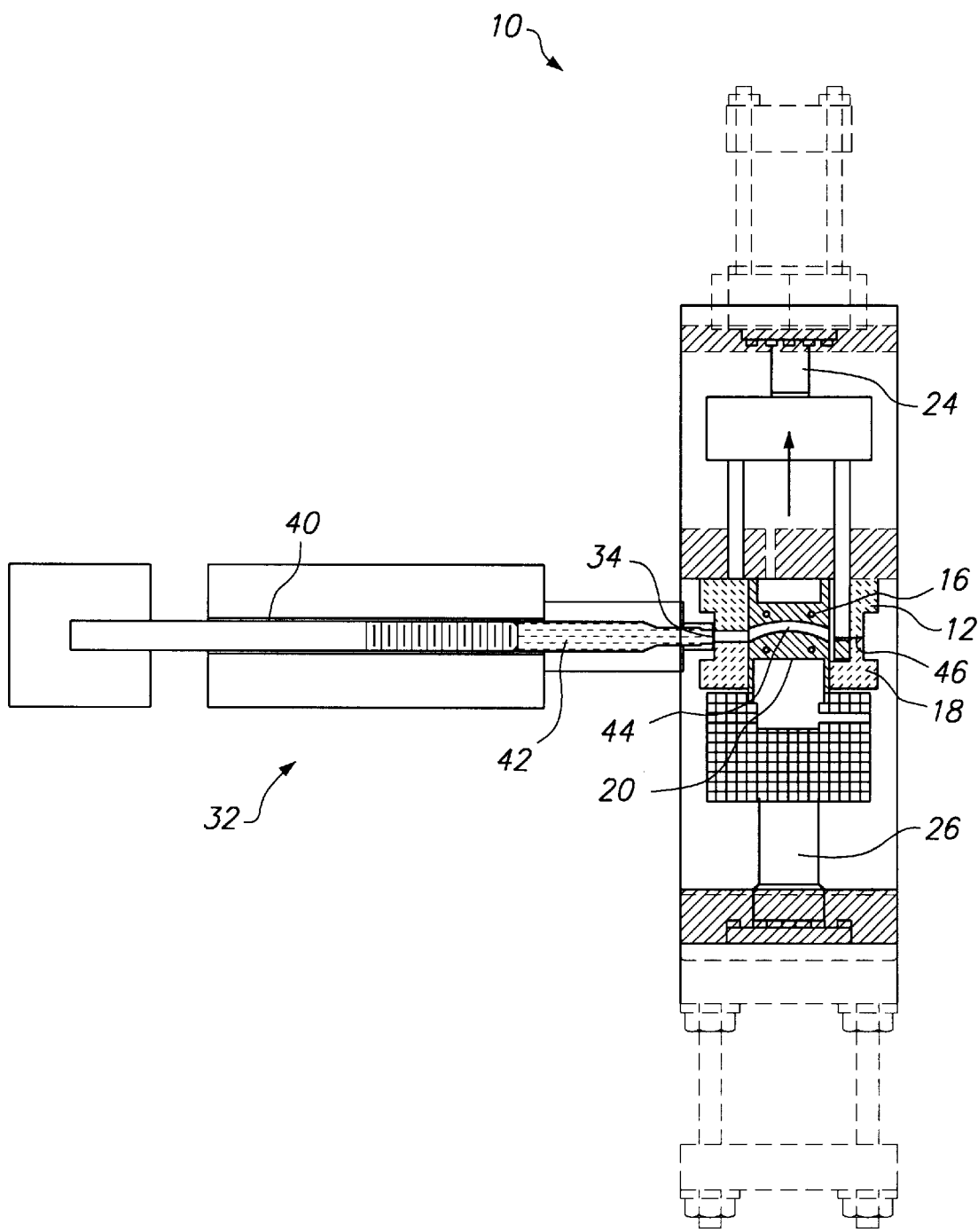
FIG. 3 is a schematic side view of the mold of FIG. 2 in a filling position.

FIG. 3 illustrates the mold 10 in a closed position in preparation for filling the mold cavity with thermoplastic material 42. As shown in FIG. 3, the lower mold cavity half 18 and lower mold member 20 are moved to the closed position by the upper hydraulic cylinder 24. The closing of the lower mold cavity half 18 against the upper mold cavity half 12 closes the parting line 46 of the mold. In the position illustrated in FIG. 3, a distance between the upper mold member 16 and the lower mold member 20 is greater than the final desired part thickness. Preferably, the distance between the mold halves is approximately 1 to 5 mm greater than the final part thickness. FIG. 3 also illustrates the injector 32 moved against the fill port 34 of the mold cavity 44 in preparation for filling of the mold. At this time, the mold is in the ready position illustrated in FIG. 3 and the mold and/or the injector unit 32 have been preheated to ensure that the thermoplastic material 42 remains in a molten form during the injection process.

Figure 4:
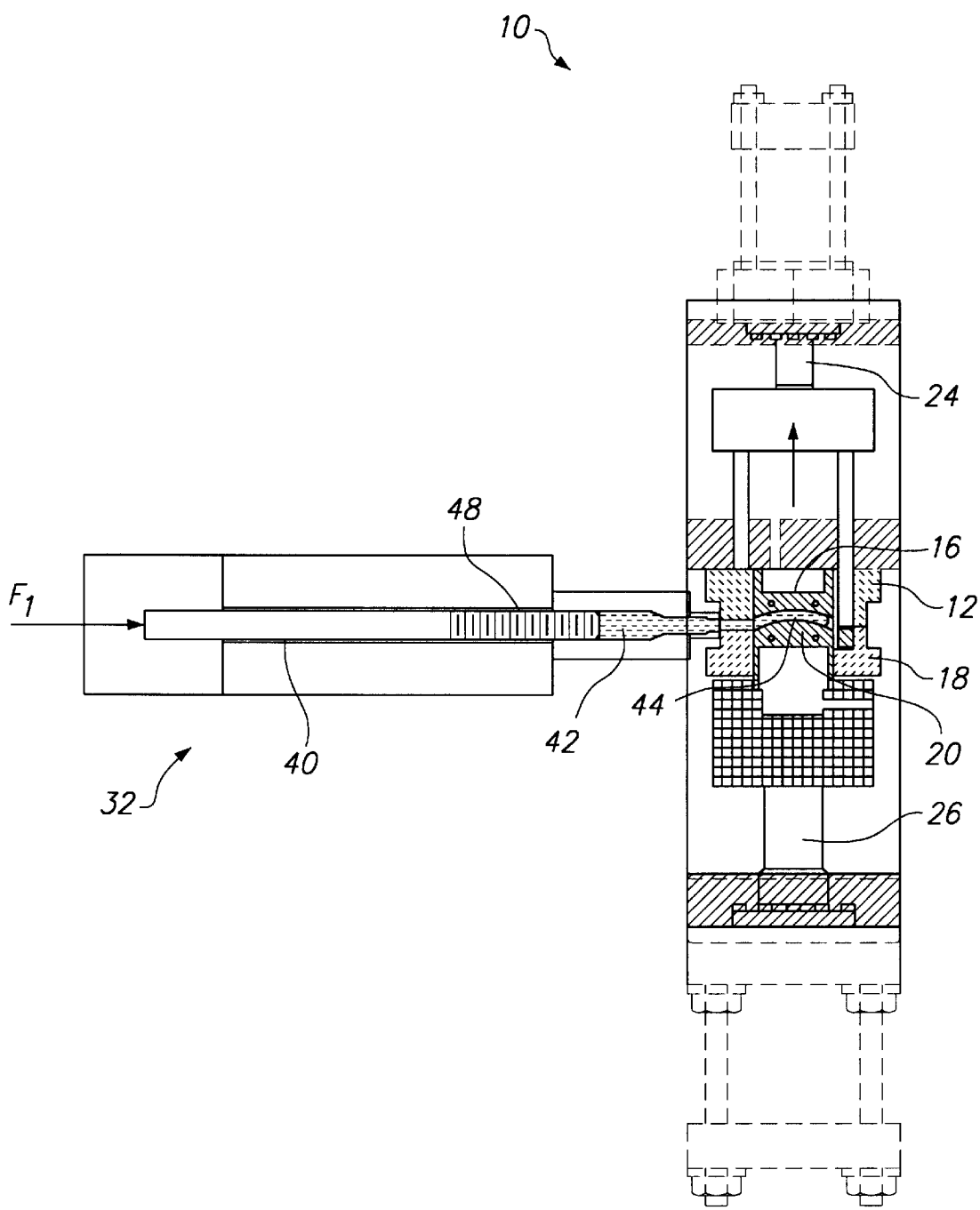
FIG. 4 is a schematic side view of the mold of FIG. 2 during filling.

FIG. 4 illustrates the mold 10 during injection of the molten thermoplastic material 42 into the mold cavity 44. During injection, the space between the upper mold member 16 and the lower mold member 20 is preferably maintained at a distance which is larger than the final part thickness. Preferably, the mold halves are held stationary during the mold cavity filling or injection step. The injector 32 may be operated by advancing a screw 48 within the barrel 40. Mold cavity filling is performed at a high pressure $F_1$, such as 10,000 psi to 20,000 psi.

Figure 5:
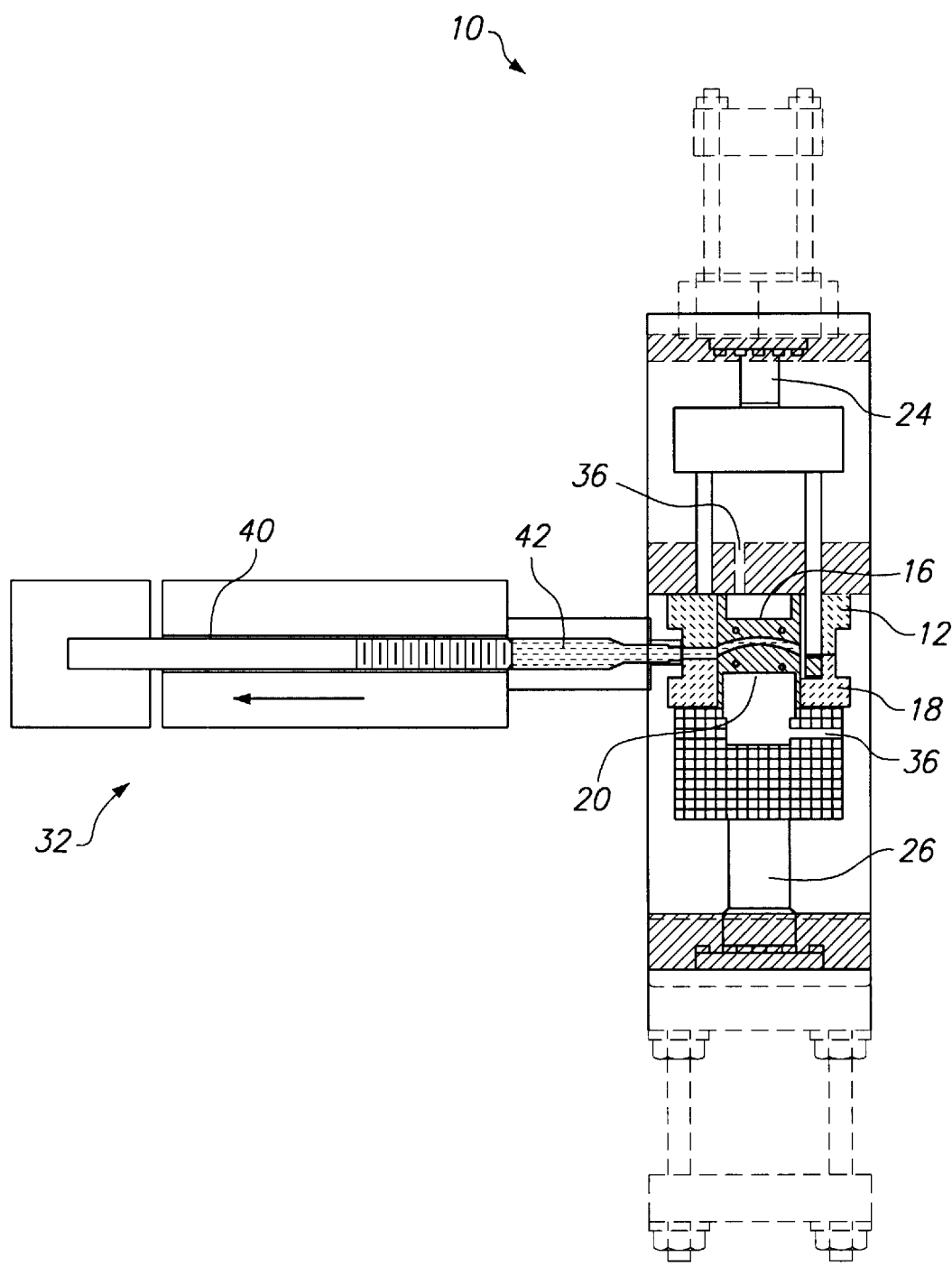
FIG. 5 is a schematic side view of the mold of FIG. 2 during pressing.

FIG. 5 illustrates the part-press step in which the mold halves 16, 20 are moved toward each other after the molten thermoplastic material 42 has been introduced into the mold cavity 44. In the mold illustrated in FIGS. 2–6 the pressing process is performed by activating the lower hydraulic cylinder 26 to move the lower mold member 20 towards the upper mold member 16. The process is complete when the two mold halves are in their final position and a distance between the upper and lower mold members 16, 20 is substantially the desired thickness of the final lens. In the mold illustrated in FIG. 5, the end of the pressing process or the bottom out point is determined by physically limiting the stroke of the lower hydraulic cylinder 26. Preferably, during the pressing process the injector 32 is optionally shut off so that no additional thermoplastic material 42 is injected. In another optional embodiment, some of the thermoplastic material 42 may be pushed back into the injector 32. Once the pressing process is finished the mold halves 16, 20 are held stationary. After the process, cooling air begins to be injected into the mold for cooling of the part. The cooling air is injected through the channels 36 in the upper and lower mold cavity halves 12, 18. Although cooling with cooling air or other fluid is preferred, cooling by natural convection may also be used.

Figure 6:
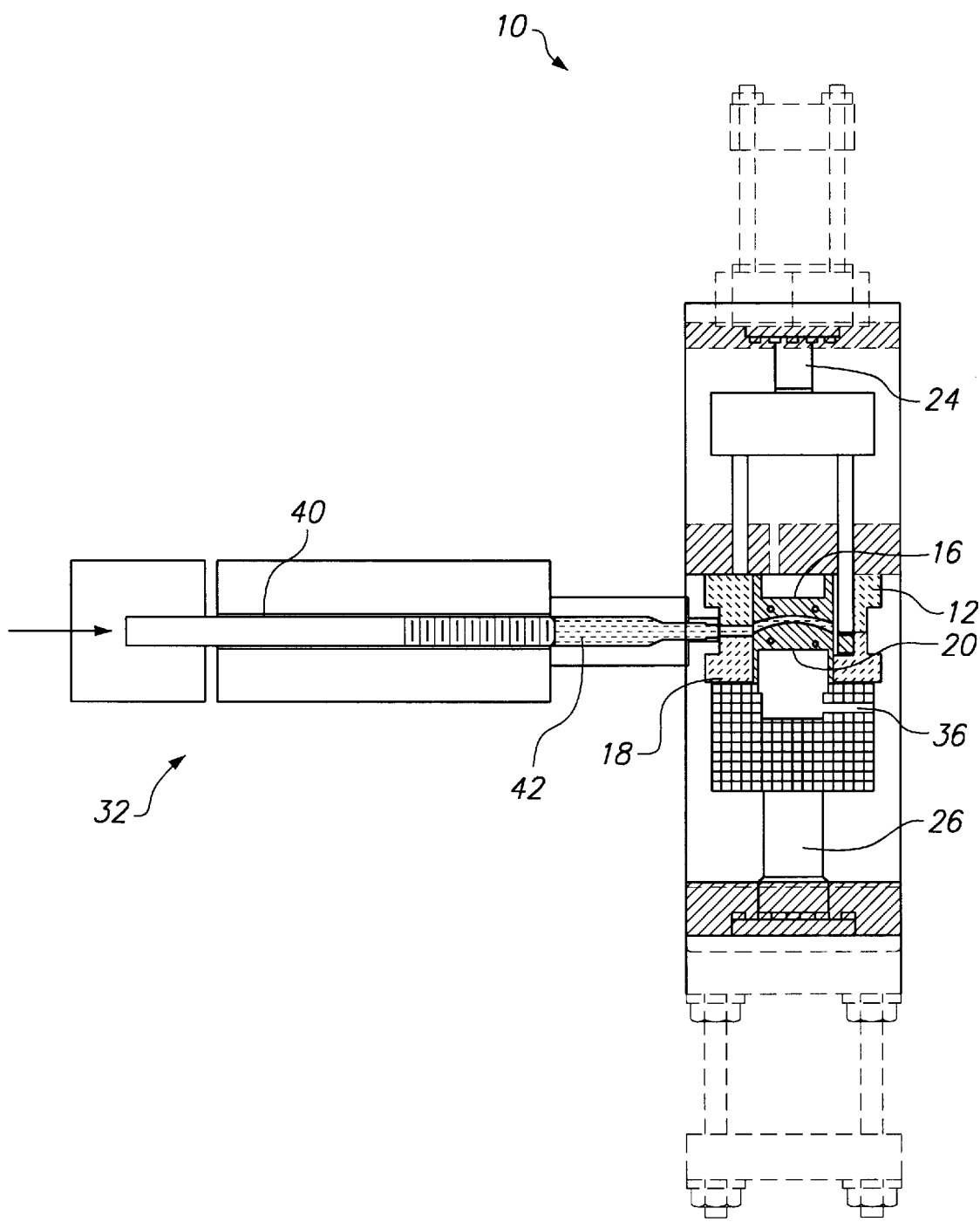
FIG. 6 is a schematic side view of the mold of FIG. 2 in a final cooling position.

The final holding and cooling position of the mold 10 is illustrated in FIG. 6. In this position, expansive pressure is applied to the thermoplastic material 42 in the mold cavity 44 to compensate for shrinkage of the part during cooling. The expansive pressure is applied, in the embodiment illustrated in FIGS. 2–6, by injecting additional thermoplastic material 42 at a low injection force with the injector 32 as the part solidifies. The upper and lower mold members 16, 20 are maintained stationary during the application of the expansive pressure. The injection pressures of the injector 32 during the application of expansive pressure are preferably low pressures, such as about 3000 psi to 7000 psi. After a predetermined cooling period the application of the expansive pressure is turned off by turning off the injector 32, final cooling occurs, and the mold is opened for part removal.

While the invention has been has been described in detail with reference to the preferred embodiments thereof, it will be apparent to one skilled in the art that various changes and modification can be made and equivalents employed, without departing from the present invention.

What is claimed is:

1. A method for manufacturing a thermoplastic lens which comprises:
   (a) providing a mold comprising a male mold half and a female mold half wherein said mold halves, when closed against one another, close a parting line of the mold, said mold further comprising a male mold member disposed within said male mold half and a female mold member disposed within said female mold half, wherein said mold members define, when said mold halves are closed, a mold cavity in the shape of a lens;
   (b) closing said mold halves of the mold so as to close the parting line of the mold, the distance between said mold members being greater than a final thickness of the to-be-formed lens;
   (c) after step (b), introducing into the mold cavity a molten thermoplastic material in a quantity at least sufficient to form a lens;
   (d) moving at least one of said male and female mold members to a predetermined hard stop point and stopping said at least one mold member at said predetermined hard stop point prior to freezing of the thermoplastic material at the thinnest point of the to-be-formed lens, the distance between the mold members at the predetermined hard stop point being substantially equal to the final thickness of the to-be-formed lens;
   (e) maintaining said mold members in a stationary position at said predetermined hard stop point while applying expansive pressure to the mold cavity; and
   (f) permitting the thermoplastic material to freeze thereby forming the thermoplastic lens.

2. The method of claim 1 wherein the thermoplastic material is selected from the group consisting of polycarbonate, acrylics and polyurethane.

3. The method of claim 2 wherein the thermoplastic material is polycarbonate.

4. The method of claim 1 wherein the lens is an ophthalmic lens.

5. The method of claim 4 wherein the ophthalmic lens is a minus lens.

6. The method of claim 5 wherein the center of the ophthalmic lens has a thickness of less than 1 millimeter.

7. The method of claim 1 wherein the cavity pressure is increased by use of at least one injector and injection of molten thermoplastic material into the mold cavity.

8. The method of claim 7 wherein at least the injector port is heated.

9. The method according to claim 1 wherein said molten thermoplastic material is introduced to the mold cavity on a heated runner or short runner of approximately 5 cm or less.

10. The method of claim 1 wherein the mold is heated to a temperature above the glass transition (Tg) or melting temperature (Tm) of the thermoplastic polymer during introduction of the molten thermoplastic material to the mold cavity.

11. A method for manufacturing a thermoplastic ophthalmic lens which comprises:
   (a) providing a mold comprising male and female mold halves wherein said mold halves, when closed, define a mold cavity in the form of a thermoplastic lens;
   (b) introducing into the mold cavity a molten thermoplastic polycarbonate material in a quantity at least sufficient to form the lens wherein said thermoplastic polycarbonate material is maintained at a temperature above about 575° F. which permits the material to flow;
   (c) moving at least one of said male and female mold halves to a pre-determined hard stop point wherein the mold cavity has a center thickness of less than 1 mm and stopping said at least one mold half at said hard stop point prior to freezing of the thermoplastic material at the thinnest point of the to-be-formed lens;
   (d) maintaining said mold halves in a stationary position at said hard stop point while applying expansive pressure in the mold cavity by use of an injector or injectors to maintain a constant volume within the mold; and
   (e) permitting the thermoplastic polycarbonate material to freeze thereby forming the thermoplastic ophthalmic lens.

12. The method of claim 11 wherein the lens is a minus lens.

13. The method of claim 11 wherein the mold pressure is increased by injection of molten thermoplastic polycarbonate material into the mold cavity.

14. The method according to claim 11 wherein said molten thermoplastic polycarbonate material is introduced to the mold cavity on a heated runner or short runner.

15. The method of claim 11 wherein the mold is heated to a temperature above the glass transition (Tg) or melting temperature (Tm) of the thermoplastic polycarbonate material during introduction of the molten thermoplastic polycarbonate material to the mold cavity.

16. The method of claim 1 wherein step (b) further includes introducing an excess of molten thermoplastic material in order to ensure complete filling of the mold cavity.

17. The method of claim 16 wherein step (b) further includes introducing the molten thermoplastic material with an injector and wherein, during step (c), some of the molten thermoplastic material is pushed back into the injector.

18. The method of claim 1 wherein step (c) further includes physically limiting movement of said at least one mold half al. said pre-determined hard stop point.

19. The method of claim 11 wherein step (b) further includes introducing an excess of molten thermoplastic polycarbonate material in order to ensure complete filling of the mold cavity.

20. The method of claim 19 wherein step (b) further includes introducing the molten thermoplastic polycarbonate material with an injector and wherein, during step (c), some of the molten thermoplastic polycarbonate material is pushed back into the injector.

21. The method of claim 11 wherein step (c) further includes physically limiting movement of said at least one mold half at said pre-determined hard stop point.

22. The method of claim 1 wherein said step of forming the thermoplastic lens further includes forming the thermoplastic lens with a center thickness less than one millimeter.

23. The method of claim 1 wherein said step of introducing into the mold cavity a molten thermoplastic material further includes introducing the molten thermoplastic at a first pressure, and said step of applying expansive pressure to the mold cavity further includes applying said expansive pressure at a second pressure, said first pressure being greater than said second pressure.

24. The method of claim 11 wherein said step of introducing into the mold cavity a molten thermoplastic material further includes introducing the molten thermoplastic at a first pressure, and said step of applying expansive pressure to the mold cavity further includes applying said expansive pressure at a second pressure, said first pressure being greater than said second pressure.

* * * * *